United States Patent
Endo

(10) Patent No.: US 6,627,709 B2
(45) Date of Patent: Sep. 30, 2003

(54) POLYMER PARTICLES, METHOD FOR THEIR MANUFACTURE, AND TONERS

(75) Inventor: Akira Endo, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/548,352

(22) Filed: Apr. 12, 2000

(65) Prior Publication Data

US 2003/0032749 A1 Feb. 13, 2003

(30) Foreign Application Priority Data

Apr. 14, 1999 (JP) ............................................. 11-106093

(51) Int. Cl.⁷ ............................... C08F 2/18; C08F 2/20
(52) U.S. Cl. ........................ 526/89; 430/107; 430/109; 526/279; 526/317.1; 526/319; 526/329.7; 526/347
(58) Field of Search ................................ 526/279, 347, 526/317.1, 319, 329.7; 430/107, 109

(56) References Cited

U.S. PATENT DOCUMENTS

| | | | | | |
|---|---|---|---|---|---|
| 4,592,990 A | * | 6/1986 | Takagi | ........................ | 430/137 |
| 4,746,590 A | * | 5/1988 | Kasai | ........................ | 430/137 |
| 4,849,318 A | * | 7/1989 | Tsubota | ........................ | 430/137 |
| 5,322,912 A | * | 6/1994 | Georges | ........................ | 526/204 |
| 5,837,416 A | * | 11/1998 | Tavernier | ........................ | 430/110 |
| 6,054,239 A | * | 4/2000 | Ohira | ........................ | 430/106 |

FOREIGN PATENT DOCUMENTS

| | | |
|---|---|---|
| JP | 3-121466 | 5/1991 |
| JP | 3-179365 | 8/1991 |
| JP | 10-20551 | 1/1998 |
| JP | 10-326029 | 12/1998 |

* cited by examiner

*Primary Examiner*—Fred Zitomer
(74) *Attorney, Agent, or Firm*—Oliff & Berridge, PLC

(57) ABSTRACT

Polymer particles are obtained by dispersion polymerization of styrene and acrylic acid ester along with an organosilane compound. The polymer particles have simultaneously an excellent particle size distribution, a large particle size and a satisfactory molecular weight. A toner in which the polymer particles are used as binder resin is especially suitable for high image quality and high-density printing.

12 Claims, 3 Drawing Sheets

FIG. 1A

| | Organosilane Compound Included | Volume Average Particle Size dv (μm) | Degree of Dispersion (dv/dn) | Content of Particles At Least 1.5 times dv(%) | Content of Particles Not More Than 0.9 times n(%) | Weight Average Molecular Weight (Mw) | Aggregation in Storage Test |
|---|---|---|---|---|---|---|---|
| Example 1 (Polymer Resin Particles A) | Yes | 9.4 | 1.19 | 2.2 | 11.2 | 22,000 | No aggregation |
| Example 2 (Polymer Resin Particles B) | Yes | 11.0 | 1.15 | 0.4 | 8.8 | 24,000 | No aggregation |
| Example 3 (Polymer Resin Particles C) | Yes | 10.1 | 1.23 | 3.2 | 10.1 | 21,000 | No aggregation |
| Example 4 (Polymer Resin Particles D) | Yes | 8.3 | 1.24 | 1.2 | 17.2 | 28,000 | No aggregation |
| Example 5 (Polymer Resin Particles E) | Yes | 8.0 | 1.25 | 4.6 | 14.1 | 25,000 | No aggregation |
| Example 6 (Polymer Resin Particles F) | Yes | 5.5 | 1.08 | 0.3 | 7.1 | 35,000 | No aggregation |
| Example 7 (Polymer Resin Particles G) | Yes | 4.2 | 1.09 | 3.8 | 5.9 | 85,000 | No aggregation |

FIG. 1B

| | Organosilane Compound Included | Volume Average Particle Size dv (μm) | Degree of Dispersion (dv/dn) | Content of Particles At Least 1.5 times dv(%) | Content of Particles Not More Than 0.9 times n(%) | Weight Average Molecular Weight (Mw) | Aggregation in Storage Test |
|---|---|---|---|---|---|---|---|
| Comparative Example 1 (Polymer Resin Particles H) | No | 5.1 | 1.12 | 1.6 | 10.5 | 22,000 | No aggregation |
| Comparative Example 2 (Polymer Resin Particles I) | No | 10.6 | 1.33 | 14.6 | 9.3 | 10,000 | Aggregation |
| Comparative Example 3 (Polymer Resin Particles J) | No | 3.1 | 1.05 | 0.5 | 5.0 | 33,000 | No aggregation |
| Comparative Example 4 (Polymer Resin Particles K) | No | 2.0 | 1.05 | 0.4 | 3.0 | 86,000 | No aggregation |
| Comparative Example 5 (Polymer Resin Particles L) | Yes | 9.4 | 1.35 | 3.8 | 27.7 | 20,000 | Aggregation |

FIG. 2

| PRODUCT NAME | STRUCTURAL FORMULA |
|---|---|
| KBM1103 | $(CH_3O)_3Si-(CH_2)_8-CH=CH_2$ |
| KBM503 | $(CH_3O)_3Si-(CH_2)_3-O-\underset{O}{\overset{\parallel}{C}}-\underset{CH_3}{\overset{\mid}{C}}=CH_2$ |
| KBM502 | $(CH_3O)_2\underset{CH_3}{\overset{\mid}{Si}}-(CH_2)_3-O-\underset{O}{\overset{\parallel}{C}}-\underset{CH_3}{\overset{\mid}{C}}=CH_2$ |
| KBM5103 | $(CH_3O)_3Si-(CH_2)_3-O-\underset{O}{\overset{\parallel}{C}}-CH=CH_2$ |
| KBM5403 | $(CH_3O)_3Si-(CH_2)_3-O-(CH_2)_2-O-\underset{O}{\overset{\parallel}{C}}-\underset{CH_3}{\overset{\mid}{C}}=CH_2$ |

POLYMER PARTICLES, METHOD FOR THEIR MANUFACTURE, AND TONERS

BACKGROUND OF THE INVENTION

1. Field of the Invention

The present invention relates to polymer particles, and more particularly to polymer resin particles which are suitable as a component of the dry-type toners which are used in copiers, printers, plotters and facsimile machines.

2. Description of the Related Art

Polymer resin particles are being manufactured using such methods as emulsion polymerization, seed polymerization, suspension polymerization and dispersion polymerization, and they are being used in various fields such as binders for toners, cosmetics, column chromatography and spacers for liquid crystal displays.

A particle size within the range from a few $\mu$m to a few tens of $\mu$m is required when polymer resin particles are to be used as a binder for a toner and, since the particle size is too small with a single polymerization using the emulsion polymerization method or the seed polymerization method, the polymerization has to be carried out repetitively, and this inevitably results in longer times and increased cost. Furthermore, although particles of a size ranging from a few $\mu$m to a few tens of $\mu$m can be obtained if the suspension polymerization method is used, in this case the particle size distribution is wide and there is pronounced variability, and aggregation and fusion are liable to occur in high temperature, high humidity environments.

Conventionally, particle size has been controlled by adjusting the amount of monomer or initiator so as to obtain the required particle size. However, if the particle size is increased using these methods of adjustment then the molecular weight is inevitably reduced at the same time and so it is difficult to produce polymer resin particles which have a large particle size and a high molecular weight.

It is easy to produce particles which have a comparatively uniform particle size in particular by using dispersion polymerization, but there is a problem in that the molecular weight falls when large particles are formed. If the molecular weight is low then the particles are liable to condense and this results in problems with a deterioration of image quality.

Hence, for use as a toner binder, the polymer particles must have a particle size from a few $\mu$m to a few tens of $\mu$m, the particle size must be uniform, and the particles must have a suitable molecular weight. However, polymer particles which satisfy these requirements cannot be manufactured cheaply and efficiently using the conventional methods.

SUMMARY OF THE INVENTION

A first object of the present invention is to provide polymer resin particles which have a comparatively large and uniform particle size which can be manufactured efficiently and cheaply. A second object of the present invention is to provide a toner which is cheap and has excellent performance.

According to a first aspect of the present invention there are provided polymer resin particles which are obtained by the dispersion polymerization of monomer which contains organosilane compound. In this invention, the variability of the particle size of the polymer resin particles which are obtained by the dispersion polymerization of monomer is small because organosilane compound is contained in the monomer which is used for the dispersion polymerization. For example, a degree of dispersion of not more than 1.3 can be obtained. Furthermore, polymer resin particles of which the content of particles at least 1.5 times the volume average particle size is not more than 5% and the content of particles not more than 0.9 times the number average particle size is not more than 20% can be obtained.

The polymer resin particles of the present invention can have a comparatively large particle size, for example a volume average particle size of from 4 to 10 $\mu$m, and a sufficient molecular weight, which is to say a weight average molecular weight of from 10,000 to 100,000. Hence the polymer resin particles of this invention are especially suitable as binder resins for the dry-type toners which are used for high image quality printing since they have simultaneously a suitable particle size distribution, a large particle size, and a sufficient molecular weight.

In the polymer resin particles of the present invention, styrene may be used as monomer, for example, from 70 to 90 wt % of the monomer. Moreover, the monomer may contain acrylic acid ester or methacrylic acid ester in addition to styrene. The monomer can contain from 1 to 5 wt % organosilane.

According to a second embodiment of the present invention there is provided a method for the manufacture of polymer resin particles comprising adding monomer which contains organosilane compound to a solvent which contains dispersing agent and dispersion-polymerizing the monomer which contains the organosilane compound. It is possible by using the method of the present invention to manufacture efficiently and cheaply polymer resin particles which have simultaneously a suitable particle size distribution, a large particle size, and a sufficient molecular weight.

According to a third embodiment of the present invention, there is provided a toner comprising polymer resin particles as binder resin, obtained by the dispersion polymerization of monomer which contains organosilane compound, and a colorant. The toner may also contain an electrostatic charge controlling agent. A toner of the present invention ensures high-density printing with high image quality since it has a resin binder which has simultaneously a suitable particle size distribution, a large particle size, and a sufficient molecular weight.

BRIEF DESCRIPTION OF THE DRAWINGS

FIGS. 1A and 1B are tables which shows the results obtained for the volume average particle size and degree of dispersion and in the storage tests in Examples 1 to 7 (Polymer Resin Particles A to G) and Comparative Examples 1 to 5 (Polymer Resin Particles H to L), respectively.

FIG. 2 shows the structural formulae of the organosilane compounds used in Examples 1 to 7.

DESCRIPTION OF THE PREFERRED EMBODIMENTS OF THE INVENTION

The polymer resin particles of the present invention are described below on the basis of practical embodiments of the invention.

The polymer resin particles of this embodiment are obtained by means of a polymerization reaction wherein an organosilane compound is added as monomer. The selection of a method of polymerization such that the particle size distribution is narrow and mono-disperse is preferred in those cases where the polymer resin particles are to be used as a structural component of a toner, and in practical terms the dispersion polymerization method is ideal.

In the dispersion polymerization method, a solvent is introduced into a polymerization reaction vessel and then monomer, dispersing agent, initiator and the like are introduced and dissolved. The temperature of the reaction system in the vessel is then raised while displacing the interior of the vessel with an inactive gas such as nitrogen and stirring the liquid and a polymerization reaction is carried out for a period of time ranging from a few hours to a few tens of hours. Subsequently, the liquid particle dispersion is separated into a solid fraction and a liquid fraction and the polymer resin particles which form the solid fraction are recovered.

A practical method whereby polymer resin particles are manufactured by dispersion polymerization is described below. A solvent is introduced into a reactor which has been fitted with a stirrer, a condenser, a thermometer, a gas delivery pipe and the like and a dispersing agent is dissolved therein when polymer resin particles are to be manufactured by means of the dispersion polymerization method. The monomer is then introduced into the reactor and then the initiator and the crosslinking agent are dissolved in the system.

One type, or a mixture of two or more types, of alcohol such as methanol, ethanol, 1-butanol, 2-butanol, t-butanol, n-amyl alcohol, s-amyl alcohol, t-amyl alcohol, isoamyl alcohol, isobutyl alcohol, 1-propanol, 2-propanol, 2-ethylbutanol, 2-ethylhexanol, 2-octanol, n-octanol, n-decanol, cyclohexanol, n-hexanol, 2-heptanol, 3-heptanol, 3-pentanol, methylcyclohexanol, 2-methyl-2-butanol, 3-methyl-2-butanol, 3-methyl-1-butyn-3-ol, 4-methyl-2-pentanol and 3-methyl-1-pentyn-3-ol can be used for the solvent.

Moreover, examples of organic solvents which can be used together with these alcohols include hydrocarbon solvents such as hexane, toluene, cyclohexane, benzene and xylene; ethers such as ethyl benzyl ether, dibutyl ether, dipropyl ether, dibenzyl ether, dimethyl ether, tetrahydrofuran, vinyl methyl ether and vinyl ethyl ether; ketones such as acetaldehyde, acetone, acetophenone, diisobutyl ketone, diisopropyl ketone and cyclohexanone; esters such as ethyl formate, ethyl acetate, methyl acetate, ethyl stearate and methyl salicylate; and water. These solvents are used to adjust the SP value (solubility parameter) of the reaction system for example.

Among the above-mentioned solvents, methanol, ethanol, 1-propanol, 2-propanol, 1-butanol and water are preferred and a combination of methanol and 2-propanol is especially desirable.

The dispersing agent may be Polyvinylpyrrolidone, poly (vinyl alcohol), polyethyleneimine, hydroxypropylcellulose, hydroxypropylmethyl(ethyl)cellulose, poly(12-hydroxystearic acid), poly(styrene-b-dimethylsiloxane), polyisobutylene, poly(acrylic acid), poly(acrylic acid ester), poly(methacrylic acid), poly(methacrylic acid ester), polyacrylamide, poly(vinyl acryl ether) and the like, and one of these dispersing agents, or a mixture of various types, may be used. Among these dispersing agents, polyvinylpyrrolidone, poly(vinyl alcohol) or polyethyleneimine is preferred for the manufacture of mono-disperse polymer resin particles with a narrow particle size distribution. Among these, polyvinylpyrrolidone is especially desirable.

The monomer may be vinylaromatics such as styrene, vinyltoluene and α-methylstyrene; methacrylic acid esters such as methyl methacrylate, ethyl methacrylate and 2-ethylhexyl methacrylate, acrylic acid esters such as methyl acrylate, ethyl acrylate, butyl acrylate and ethylhexyl acrylate; vinyl esters such as vinyl formate, vinyl acetate and vinyl propionate; vinyl ethers such as vinyl methyl ether and vinyl ethyl ether; monomers which have functional groups such as methacrylic acid, acrylic acid, maleic anhydride and metal salts thereof, diethylaminoethyl methacrylate and diethylaminoethyl acrylate; and fluorine-containing monomers such as trifluoroethyl methacrylate and tetrafluoropropyl methacrylate. These monomers may be used individually, or combinations of a plurality of such monomers may be used.

The polymer resin particles which are used as binder particles for toners preferably have a high transparency when applications for OHP sheets are considered. Furthermore, good insulating properties are desirable for obtaining well-developed images. Moreover, a high mechanical strength at ambient temperature is required to prevent destruction inside the developing apparatus, and softening without the need for a large amount of thermal energy and fixing in the form of the formed image are desirable for obtaining good fixing properties. In consideration of the above, styrene alone, mixtures of styrene with acrylic acid esters, or mixtures of styrene and methacrylic acid esters, are especially preferred for the monomer when the polymer resin particles are to be used as binder particles for a toner.

The use of styrene as the main monomer in combination with n-butyl acrylate, methyl acrylate, ethyl acrylate, acrylic acid, methyl methacrylate, ethyl methacrylate, methacrylic acid or vinyl-biphenyl is especially desirable. Combinations of styrene and n-butyl acrylate are even more desirable.

The organosilane compound may be, for example, vinyltrichlorosilane, vinyltrimethoxysilane, vinyltriethoxysilane, vinyltris-(β-methoxyethoxy)silane, γ-methacryloxypropylmethyldimethoxysilane, γ-methacryloxypropyltrimethoxysilane, γ-methacryloxypropylmethyldiethoxysilane and γ-methacryloxypropyltriethoxysilane. In terms of trade names, these include KA1003, KBM1003, KBE1003, KBC1003, KBM1063, KBM1103, KBM1203, KBM1303, KBM1403, KBM503, KBE503, KBM502, KBE502, KBM5103, KBM5102 and KBM5403 manufactured by the Shin'etsu Kagaku Kogyo K.K. Among these, γ-(methacryloxypropyl)trimethoxysilane and vinyltrimethoxysilane are preferred, and γ-(methacryloxypropyl) trimethoxysilane is especially desirable.

The initiator may be an azo-based hydrochloride initiator such as 2,2'-azobis(2-methyl-N-phenylpropionamidine) dihydrochloride, 2,2'-azobis[N-(4-chlorophenyl)-2-methylpropionamidine] dihydrochloride, 2,2'-azobis[N-(4-hydroxyphenyl)-2-methylpropionamidine] dihydrochloride, 2,2'-azobis[N-(4-aminophenyl)-2-methylpropionamidine] tetrahydrochloride, 2,2'-azobis[2-methyl-N-phenylmethyl) propionamidine] dihydrochloride, 2,2'-azobis[2-methyl-N-2-propenylpropionamidine] dihydrochloride, 2,2'-azobis(2-methylpropionamidine) dihydrochloride, 2,2'-azobis[N-(2-hydroxyethyl)-2-methylpropionamidine] dihydrochloride, 2,2'-azobis[(2-5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyridin-2-yl)propane] dihydrochloride, 2,2'-azobis[2-(5-hydroxy-3,4,5,6-tetrahydropyridin-2-yl) propane] dihydrochloride and 2,2'-azobis{2-[1-(2-hydroxyethyl)-2-imidazolin-2-yl]propane} dihydrochloride.

2,2'-Azobisisobutyronitrile, 2,2'-azobismethylbutyronitronitrile, 2,2'-azobis-2-cyclopropylpropionitrile, 2,2'-azobis-4-methoxy-2,4-dimethylvaleronitrile, 1,1'-azobiscyclohexane-1-carbonitrile, 2,2'-azobis(2,4-dimethyl)valeronitrile, 2-phenylazo-4-methoxy-2,4-dimethylvaleronitrile and 2,2'-azobis-N,N'-dimethyleneisobutylamidine and the like may be used as other azo-based initiators. Furthermore, benzoyl peroxide, methyl ethyl ketone peroxide, cumene hydroperoxide, t-butyl hydroperoxide, cyclohexanone peroxide, t-butyl peroxide, t-butyl peroxybenzoate, t-butyl peroxy-2-ethylhexanate, t-butyl peroxypavalate, t-butyl peroxyneodecanoate, 3,5,5-trimethylhexanoyl peroxide, diisopropylbenzene hydroperoxide, lauroyl peroxide and dicumyl peroxide, for example can be cited as organic peroxide-based initiators. These initiators may be used individually, or a mixture of a plurality of initiators can be used. Among these, azobisiso-butyronitrile or benzoyl peroxide is preferred, and azobisisobutyronitrile is especially desirable.

The crosslinking agent may be, for example, divinylbenzene, ethylene glycol di(meth)acrylate, butanediol di(meth)acrylate, trimethylolpropane tri(meth)acrylate and pentaerythritol tri(meth)acrylate. In consideration of the use of styrene alone, mixtures of styrene and acrylic acid esters or mixtures of styrene and methacrylic acid esters as monomer, when polymerizing resin particles, divinylbenzene, divinylbiphenyl and ethylene glycol di(meth)acrylate from among these crosslinking agents are desirable. The use of divinylbenzene is especially desirable.

Moreover, chain transfer agents such as 3-mercaptopropionic acid may also be added. The structural components of the abovementioned liquid may be used, for example, in the proportions indicated below.

Dispersing Agent: From 3 to 25 parts by weight, and preferably from 6 to 12 parts by weight.

Solvent: From 250 to 500 parts by weight, and preferably from 280 to 320 parts by weight.

Styrene Monomer: From 70 to 90 parts by weight, and preferably from 77 to 83 parts by weight.

Other Monomer: From 10 to 30 parts by weight, and preferably from 17 to 23 parts by weight.

Organosilane Compound: From 1 to 5 parts by weight, and preferably about 3 parts by weight.

Initiator: From 1 to 10 parts by weight, and preferably from 1 to 6 parts by weight.

Crosslinking Agent: From 0 to 5 parts by weight, and preferably from 0.5 to 2 parts by weight.

Chain Transfer Agent: From 0 to 5 parts by weight, and preferably from 0 to 3 parts by weight.

The preferred polymerization conditions are as indicated below. Preferred polymerization time is from 10 to 30 hours and particularly from 13 to 28 hours. Preferred polymerization temperature is from 50 to 60° C., and preferably from 58 to 60° C. Under these conditions, the temperature-rise rate may be controlled to from 0.5 to 1.5° C./minute, and preferably to from 1 to 1.5° C./minute.

Then, after completing the polymerization reaction in the abovementioned reaction system, the reaction liquid is filtered, the unwanted dispersing agent and monomer in the reaction liquid are removed, and the polymer resin particles are recovered. The polymer resin particles are then washed by dispersing the recovered polymer resin particles in solvent and filtering again. Polymer resin particles with no residual impurity can be obtained by repeating this washing process from 1 to about 5 times. The washing process may be performed by centrifugal washing of polymer resin particles with alcohol or a mixture of alcohol and water, or pressure filter washing of the polymer resin particles. After washing, the polymer resin particles are dried preferably by stirring dry or air-dry.

Polymer resin particles which have the degree of dispersion of not more than 1.3, especially not more than 1.2 and a comparatively large particle size are obtained by means of dispersion polymerization carried out in the way described above. In particular, it is possible to obtain polymer resin particles of volume average particle size from 4 to 10 $\mu$m, and especially of from 4 to 7 $\mu$m, by adjusting the polymerization conditions. Furthermore, it is possible to obtain fine polymer particles of weight average molecular weight (Mw) from 10,000 to 100,000, and especially of from 30,000 to 90,000. Furthermore, it is possible to obtain polymer resin particles of number average molecular weight (Mn) from 2000 to 40,000, and especially of from 15,000 to 35,000. A value of Mw/Mn within the range from 1.5 to 10 can be obtained. Furthermore, a degree of crosslinking of the polymer obtained calculated as a gel fraction of 2 to 15%, and especially of from 2 to 10%, may be obtained. The degree of crosslinking expressed by the gel fraction is determined, for example, by the weight of residue which is left on a filter by filtering a solution of dried polymer particles dissolved in tetrahydrofuran solvent with a membrane filter.

In terms of the thermal characteristics, polymer resin particles of glass transition point (Tg) from 60 to 85° C., and especially of from 70 to 80° C., of softening point temperature (Ts) from 65 to 110° C., and especially of from 70 to 85° C., and of flow beginning temperature from 90 to 160° C., and especially of from 100 to 130° C., for example, may be obtained.

Polymer resin particles of the present invention may be used as a binder for a dry-type toner. In this case the polymer resin particles are colored. As colorant, pigment or dye may be used, and the dye is preferably used. The coloring process may be carried out after or before the drying of the polymer resin particles. It is possible to carry out the coloring process simultaneously with the polymerization process by adding the colorant to the polymerization reactants.

The method described in Japanese Patent Application Laid-open No. 3-121466 in which a dye is dispersed or dissolved in an organic solvent in which the polymer resin particles do not dissolve and polymer resin particles are dispersed therein and heated and maintained, with stirring, at a temperature below the glass transition point can be cited as a method of coloring polymer resin particles. Furthermore, ultrasonic irradiation may be used to accelerate dispersion or dissolution of the dye and also to prevent aggregation of the polymer resin particles while coloring is being carried out, as described in Japanese Patent Application Laid-open No. 3-179365. A method in which polymer resin particles and a dye are dispersed in water, and heated at a temperature within a range of the softening point of the polymer resin particles to 40° C. higher than the softening point while stirring may be used, as described in Japanese Patent Application Laid-open No. 10-326029, the content of which is incorporated herein by reference.

Any dyes, such as disperse dyes, oil-soluble dyes, sublimable dyes, basic dyes and acid dyes, may be used as the dye which is used for coloring purposes. Dyes which have good coloring efficiency should be selected by carrying out dyeing tests beforehand.

After being colored with a dye, the polymer resin particles may be washed to remove any dye which has been precipitated on their surface. Water or an alcohol, or an organic solvent in which the dye is soluble but in which the polymer particles are insoluble, or a mixture of such solvents, can be used for this washing process.

Parent toner particles are then formed, with the addition of electrostatic charge controlling agent to the polymer resin particles, as required. For example, an electrostatic charge controlling agent can be driven into the surface of the polymer resin particles by applying a sheer force of a certain intensity while mixing the electrostatic charge controlling agent with the polymer resin particles.

Metal-containing azo compounds, salicylic acid-based metal complexes, nigrosine, triphenylmethane and quaternary ammonium salts, for example, may be used as electrostatic charge control agents.

Electrically conductive fine powders can be applied externally to the surfaces of the parent toner particles in order to improve the uniformity of the electrostatic charge. Electrically conductive titanium oxide, carbon black, and fine metal oxide or metal powders such as alumina powder and nickel powder can be cited as such fine electrically conductive powders.

EXAMPLES

Examples of polymer resin particles of the present invention are described below.

Example 1
(Polymer Resin Particles A)

Methanol and 2-propanol as solvent, polyvinylpyrrolidone (K-30) as dispersing agent, styrene and n-butyl acrylate as monomer, KBM503 (manufactured by the Shin'etsu Kagaku Kogyo K.K.) which has the structural formula shown in FIG. 2 as organosilane compound and 2,2'-azobisisobutyronitrile as initiator were introduced into a reactor provided with a stirrer, a condenser, a thermometer and a gas delivery tube while purging the reactor with nitrogen gas from the gas delivery tube, and the reaction liquid was heated to 60° C. and stirred at 100 rpm. The number of parts by weight of each component is shown in Table 1.

TABLE 1

Polymer Resin Particles A (Example 1)

| Component | Parts by Weight |
| --- | --- |
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM503 | 3 parts by weight |
| 2,2'-Azobisiso-butyronitrile | 6 parts by weight |

After polymerizing for 16 hours, the mixture was cooled to stop the polymerization reaction. The polymer resin particles obtained were recovered by filtration and then washed with methanol and dried for 48 hours at room temperature, and polymer resin particles A were obtained.

On measuring the particle size of the polymer resin particles A using a Coulter Counter (manufactured by the Coulter Co.) the volume average particle size (dv) was 9.4 $\mu$m, the value for volume average particle size (dv)/number average particle size (dn), which is to say the degree of dispersion, was 1.19, the content of particles at least 1.5 times the volume average particle size (dv) was 2.2% and the content of particles not more than 0.9 times the number average particle size (dn) was 11.2%.

The value obtained on measuring the weight average molecular weight (Mw) of the polymer resin particles A by dissolving the particles in tetrahydrofuran and using a gel permeation chromatograph (manufactured by the Nippon Bunko Kogyo Co.) was 22,000. Storage tests in an environment at a temperature of 35° C. and relative humidity 85% for 1 month were carried out with the polymer resin particles A and no aggregation or fusion of the particles was seen.

Example 2
(Polymer Resin Particles B)

Polymer resin particles B were obtained with the same method as in Example 1 using methanol and 2-propanol as solvent, polyvinylpyrrolidone (K-30) as dispersing agent, styrene and n-butyl acrylate as monomer, KBM502 (manufactured by the Shin-Etsu Kagaku Kogyo Co.) which has the structural formula shown in FIG. 2 as organosilane compound and 2,2'-azobisisobutyronitrile as initiator. The number of parts by weight of each component is shown in Table 2.

TABLE 2

Polymer Resin Particles B (Example 2)

| Component | Parts by Weight |
| --- | --- |
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM502 | 3 parts by weight |
| 2,2'-Azobisiso-butyronitrile | 6 parts by weight |

On measuring the particle size of the polymer resin particles B using the same method as in Example 1, the volume average particle size (dv) was 11.0 $\mu$m, the value for volume average particle size (dv)/number average particle size (dn) was 1.15, the content of particles at least 1.5 times the volume average particle size (dv) was 0.4% and the content of particles not more than 0.9 times the number average particle size (dn) was 8.8%.

The value obtained on measuring the weight average molecular weight (Mw) of the polymer resin particles B using the same method as in Example 1 was 24,000. Storage tests were carried out with these polymer resin particles B in the same way as in Example 1 and no aggregation or fusion of the particles was seen.

Example 3
(Polymer Resin Particles C)

Polymer resin particles C were obtained with the same method as in Example 1 using methanol and 2-propanol as solvent, polyvinylpyrrolidone (K-30) as dispersing agent, styrene and n-butyl acrylate as monomer, KBM1003 (manufactured by the Shin'etsu Kagaku Kogyo K.K.) which has the structural formula shown in FIG. 2 as organosilane compound and 2,2'-azobisisobutyronitrile as initiator. The number of parts by weight of each component is shown in Table 3.

TABLE 3

Polymer Resin Particles C (Example 3)

| Component | Parts by Weight |
|---|---|
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM1003 | 3 parts by weight |
| 2,2'-Azobisiso-butyronitrile | 6 parts by weight |

On measuring the particle size of the polymer resin particles C using the same method as in Example 1, the volume average particle size (dv) was 10.1 μm, the value for volume average particle size (dv)/number average particle size (dn) was 1.23, the content of particles at least 1.5 times the volume average particle size (dv) was 3.2% and the content of particles not more than 0.9 times the number average particle size (dn) was 10.1%.

The value obtained on measuring the weight average molecular weight (Mw) of the polymer resin particles C using the same method as in Example 1 was 21,000. Storage tests were carried out with these polymer resin particles C in the same way as in Example 1 and no aggregation or fusion of the particles was seen.

Example 4
(Polymer Resin Particles D)

Polymer resin particles D were obtained with the same method as in Example 1 using methanol and 2-propanol as solvent, polyvinylpyrrolidone (K-30) as dispersing agent, styrene and n-butyl acrylate as monomer, KBM5403 (manufactured by the Shin'etsu Kagaku Kogyo K.K.) which has the structural formula shown in FIG. 2 as organosilane compound and 2,2'-azobisisobutyronitrile as initiator. The number of parts by weight of each component is shown in Table 4.

TABLE 4

Polymer Resin Particles D (Example 4)

| Component | Parts by Weight |
|---|---|
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM5403 | 3 parts by weight |
| 2,2'-Azobisiso-butyronitrile | 6 parts by weight |

On measuring the particle size of the polymer resin particles D using the same method as in Example 1, the volume average particle size (dv) was 8.3 μm, the value for volume average particle size (dv)/number average particle size (dn) was 1.24, the content of particles at least 1.5 times the volume average particle size (dv) was 1.2% and the content of particles not more than 0.9 times the number average particle size (dn) was 17.2%.

The value obtained on measuring the weight average molecular weight (Mw) of the polymer resin particles D using the same method as in Example 1 was 28,000. Storage tests were carried out with the polymer resin particles D in the same way as in Example 1 and no aggregation or fusion of the particles was seen.

Example 5
(Polymer Resin Particles E)

Polymer resin particles E were obtained with the same method as in Example 1 using methanol and 2-propanol as solvent, polyvinylpyrrolidone (K-30) as dispersing agent, styrene and n-butyl acrylate as monomer, KBM5103 (manufactured by the Shin'etsu Kagaku Kogyo K.K.) which has the structural formula shown in FIG. 2 as organosilane compound and 2,2'-azobisisobutyronitrile as initiator. The number of parts by weight of each component is shown in Table 5.

TABLE 5

Polymer Resin Particles E (Example 5)

| Component | Parts by Weight |
|---|---|
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM5103 | 3 parts by weight |
| 2,2'-Azobisiso-butyronitrile | 6 parts by weight |

On measuring the particle size of the polymer resin particles E using the same method as in Example 1, the volume average particle size (dv) was 8.0 μm, the value for volume average particle size (dv)/number average particle size (dn) was 1.25, the content of particles at least 1.5 times the volume average particle size (dv) was 4.6% and the content of particles not more than 0.9 times the number average particle size (dn) was 14.1%.

The value obtained on measuring the weight average molecular weight (Mw) of the polymer resin particles E using the same method as in Example 1 was 25,000. Storage tests were carried out with the polymer resin particles E in the same way as in Example 1 and no aggregation or fusion of the particles was seen.

Example 6
(Polymer Resin Particles F)

Polymer resin particles F were obtained with the same method as in Example 1 using methanol and 2-propanol as solvent, polyvinylpyrrolidone (K-30) as dispersing agent, styrene and n-butyl acrylate as monomer, KBM502 (manufactured by the Shin'etsu Kagaku Kogyo K.K.) as organosilane compound and 2,2'-azobisisobutyronitrile as initiator. The number of parts by weight of each component is shown in Table 6.

TABLE 6

Polymer Resin Particles F (Example 6)

| Component | Parts by Weight |
|---|---|
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM502 | 3 parts by weight |
| 2,2'-Azobisiso-butyronitrile | 3 parts by weight |

On measuring the particle size of the polymer resin particles F using the same method as in Example 1, the volume average particle size (dv) was 5.5 μm, the value for volume average particle size (dv)/number average particle size (dn) was 1.08, the content of particles at least 1.5 times the volume average particle size (dv) was 0.3% and the content of particles not more than 0.9 times the number average particle size (dn) was 7.1%.

The value obtained on measuring the weight average molecular weight (Mw) of the polymer resin particles F using the same method as in Example 1 was 35,000. Storage tests were carried out with the polymer resin particles F in the same way as in Example 1 and no aggregation or fusion of the particles was seen.

Example 7
(Polymer Resin Particles G)

Polymer resin particles G were obtained with the same method as in Example 1 using methanol and 2-propanol as solvent, polyvinylpyrrolidone (K-30) as dispersing agent, styrene and n-butyl acrylate as monomer, KBM503 (manufactured by the Shin'etsu Kagaku Kogyo K.K.) as organosilane compound and 2,2'-azobisisobutyronitrile as initiator. The number of parts by weight of each component is shown in Table 7.

TABLE 7

Polymer Resin Particles G (Example 7)

| Component | Parts by Weight |
| --- | --- |
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 20 parts by weight |
| KBM503 | 3 parts by weight |
| 2,2'-Azobisisobutyronitrile | 1 part by weight |

On measuring the particle size of the polymer resin particles G using the same method as in Example 1, the volume average particle size (dv) was 4.2 µm, the value for volume average particle size (dv)/number average particle size (dn) was 1.09, the content of particles at least 1.5 times the volume average particle size (dv) was 3.8% and the content of particles not more than 0.9 times the number average particle size (dn) was 5.9%.

The value obtained on measuring the weight average molecular weight (Mw) of the polymer resin particles G using the same method as in Example 1 was 85,000. Storage tests were carried out with the polymer resin particles G in the same way as in Example 1 and no aggregation or fusion of the particles was seen.

Comparative Example 1
(Polymer Resin Particles H)

Polymer resin particles H were obtained with the same method as in Example 1 using methanol and 2-propanol as solvent, polyvinylpyrrolidone (K-30) as dispersing agent, styrene and n-butyl acrylate as monomer and 2,2'-azobisisobutyronitrile as initiator. The number of parts by weight of each component is shown in Table 8.

TABLE 8

Polymer Resin Particles H
(Comparative Example 1)

| Component | Parts by Weight |
| --- | --- |
| Methanol | 233 parts by weight |
| 2-Propanol | 58 parts by weight |
| Polyvinylpyrrolidone | 6 parts by weight |
| Styrene | 83 parts by weight |
| n-Butyl acrylate | 17 parts by weight |
| 2,2'-Azobisisobutyronitrile | 6 parts by weight |

On measuring the particle size of the polymer resin particles H using the same method as in Example 1, the volume average particle size (dv) was 5.1 µm, the value for volume average particle size (dv)/number average particle size (dn) was 1.12, the content of particles at least 1.5 times the volume average particle size (dv) was 1.6% and the content of particles not more than 0.9 times the number average particle size (dn) was 10.5%.

The value obtained on measuring the weight average molecular weight (Mw) of the polymer resin particles H using the same method as in Example 1 was 22,000. Storage tests were carried out with the polymer resin particles H in the same way as in Example 1 and no aggregation or fusion of the particles was seen.

Comparative Example 2
(Polymer Resin Particles I)

Polymer resin particles I were obtained with the same method as in Example 1 using methanol and 2-propanol as solvent, polyvinylpyrrolidone (K-30) as dispersing agent, styrene and n-butyl acrylate as monomer and 2,2'-azobisisobutyronitrile as initiator. The number of parts by weight of each component is shown in Table 9.

TABLE 9

Polymer Resin Particles I
(Comparative Example 2)

| Component | Parts by Weight |
| --- | --- |
| Methanol | 233 parts by weight |
| 2-Propanol | 58 parts by weight |
| Polyvinylpyrrolidone | 6 parts by weight |
| Styrene | 70 parts by weight |
| n-Butyl acrylate | 30 parts by weight |
| 2,2'-Azobisisobutyronitrile | 6 parts by weight |

On measuring the particle size of the polymer resin particles I using the same method as in Example 1, the volume average particle size (dv) was 10.6 µm, the value for volume average particle size (dv)/number average particle size (dn) was 1.33, the content of particles at least 1.5 times the volume average particle size (dv) was 14.6% and the content of particles not more than 0.9 times the number average particle size (dn) was 9.3%.

The value obtained on measuring the weight average molecular weight (Mw) of the polymer resin particles I using the same method as in Example 1 was 10,000. Storage tests were carried out with the polymer resin particles I in the same way as in Example 1 and aggregation of the particles was seen, and the volume average particle size (dv) increased to 12.0 µm and the value of volume average particle size (dv)/number average particle size (dn) increased to 1.55.

Comparative Example 3
(Polymer Resin Particles J)

Polymer resin particles J were obtained with the same method as in Example 1 using methanol and 2-propanol as solvent, polyvinylpyrrolidone (K-30) as dispersing agent, styrene and n-butyl acrylate as monomer and 2,2'-azobisisobutyronitrile as initiator. The number of parts by weight of each component is shown in Table 10.

TABLE 10

Polymer Resin Particles J
(Comparative Example 3)

| Component | Parts by Weight |
|---|---|
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 23 parts by weight |
| 2,2'-Azobisisobutyronitrile | 3 parts by weight |

On measuring the particle size of the polymer resin particles J using the same method as in Example 1, the volume average particle size (dv) was 3.1 μm, the value for volume average particle size (dv)/number average particle size (dn) was 1.05, the content of particles at least 1.5 times the volume average particle size (dv) was 0.5% and the content of particles not more than 0.9 times the number average particle size (dn) was 5.0%.

The value obtained on measuring the weight average molecular weight (Mw) of the polymer resin particles J using the same method as in Example 1 was 33,000. Storage tests were carried out with the polymer resin particles J in the same way as in Example 1 and no aggregation or fusion of the particles was seen.

Comparative Example 4
(Polymer Resin Particles K)

Polymer resin particles K were obtained with the same method as in Example 1 using methanol and 2-propanol as solvent, polyvinylpyrrolidone (K-30) as dispersing agent, styrene and n-butyl acrylate as monomer and 2,2'-azobisisobutyronitrile as initiator. The number of parts by weight of each component is shown in Table 11.

TABLE 11

Polymer Resin Particles K
(Comparative Example 4)

| Component | Parts by Weight |
|---|---|
| Methanol | 233 parts by weight |
| 2-Propanol | 58 parts by weight |
| Polyvinylpyrrolidone | 6 parts by weight |
| Styrene | 77 parts by weight |
| n-Butyl acrylate | 23 parts by weight |
| 2,2'-Azobisisobutyronitrile | 1 part by weight |

On measuring the particle size of the polymer resin particles K using the same method as in Example 1, the volume average particle size (dv) was 2.0 μm, the value for volume average particle size (dv)/number average particle size (dn) was 1.05, the content of particles at least 1.5 times the volume average particle size (dv) was 0.4% and the content of particles not more than 0.9 times the number average particle size (dn) was 3.0%.

The value obtained on measuring the weight average molecular weight (Mw) of the polymer resin particles J using the same method as in Example 1 was 86,000. Storage tests were carried out with the polymer resin particles J in the same way as in Example 1 and no aggregation or fusion of the particles was seen.

Comparative Example 5
(Polymer Resin Particles L)

The polymer resin particles L of Comparative Example 5 were prepared by means of the suspension polymerization method.

TABLE 12

Polymer Resin Particles L
(Comparative Example 5)

| Component | Parts by Weight |
|---|---|
| Styrene | 70 parts by weight |
| n-Butyl acrylate | 30 parts by weight |
| 2,2'-Azobisisobutyronitrile | 6 parts by weight |
| Poly(hexamethylene adipate) | 3 parts by weight |

The numbers of parts by weight shown in Table 12 of styrene, n-butyl acrylate, 2,2'-azobisisobutyronitrile and poly(hexamethylene adipate) were introduced into a ball mill and milled for 2 hours to provide a monomer mixture.

Next 1000 parts by weight of ion-exchanged water were introduced into a reactor and stirred with a Clearmix (manufactured by the M. Technic K.K.) and the above-mentioned monomer mixture was added and dispersion and granulation were carried out for 20 minutes at 10,000 rpm. The reactor was displaced with nitrogen and then, switching to a stirrer which was fitted with a paddle blade, the mixture was stirred at 100 rpm as it was being heated to 70° C. After polymerizing for 10 hours the mixture was cooled to below 50° C. and 5 parts by weight of KBM503 (manufactured by the Shin'etsu Kagaku Kogyo K.K.) were added and the mixture was stirred for 1 hour. The polymer resin particles obtained were recovered by filtration, washed with alkali and then with water, after which they were dewatered and left to stand for 48 hours at room temperature and dried, and the polymer resin particles L were obtained.

On measuring the particle size of the polymer resin particles L using the same method as in Example 1, the volume average particle size (dv) was 9.4 μm, the value for volume average particle size (dv)/number average particle size (dn) was 1.35, the content of particles at least 1.5 times the volume average particle size (dv) was 3.8% and the content of particles not more than 0.9 times the number average particle size (dn) was 27.7%.

Furthermore, the value obtained on measuring the weight average molecular weight (Mw) of the polymer resin particles L using the same method as in Example 1 was 20,000. Storage tests were carried out with the polymer resin particles L in the same way as in Example 1 and aggregation of the particles was seen, and the volume average particle size (dv) increased to 11.4 μm and the value of volume average particle size (dv)/number average particle size (dn) increased to 1.50.

The results obtained for the volume average particle size and degree of dispersion and in the storage tests in Examples 1 to 7 (Polymer Resin Particles A to G) and Comparative Example 1 to 5 (Polymer Resin Particles H to L) are shown in FIGS. 1A and 1B, respectively.

As shown in FIG. 1, the particles which had been prepared by dispersion polymerization with the addition of organosilane compound as a monomer (polymer resin particles A to G) were mono-disperse with a narrow particle size distribution, the fall in molecular weight was suppressed even when the particle size was increased, and aggregation or fusion was unlikely to occur even under high temperature high humidity conditions.

Hence, if such polymer resin particles are used as the binder for a dry-type toner then, even in those cases where a large value is specified for binder particle size, it is possible to produce a toner which is free from problems such as aggregation both cheaply and efficiently.

According to the present invention, it is possible to obtain polymer resin particles of which the variability of the particle size is low, even in the case of comparatively large particles, and which can be manufactured efficiently and cheaply.

The present invention can manufacture efficiently and cheaply polymer resin particles of which the variability of the particle size is small even with a comparatively large particle size and so it is possible to obtained binders for toners which are cheap and perform well.

What is claimed is:

1. A method for the manufacture of polymer particles, comprising:

adding at least two types of monomers to a solvent comprising dispersing agent, wherein the at least two types of monomers include at least one ethylenically unsaturated organosilane compound; and dispersion-polymerizing the at least two types of monomers in said solvent to form a copolymer.

2. The method of manufacture according to claim 1, wherein the at least two types of monomers include styrene.

3. The method of manufacture according to claim 1, therein the at least two types of monomers include at least one of acrylic acid ester and methacrylic acid ester.

4. The method of manufacture according to claim 1, wherein the at least two types of monomers comprise from 1 to 5 wt % of the organosilane compound.

5. A method for the manufacture of polymer particles, comprising:

adding at least one type of monomer to a solvent which contains dispersing agent, wherein said at least one type of monomer includes at least one ethylenically unsaturated organosilane compound; and dispersion-polymerizing the at least one type of monomer in said solvent.

6. The method of manufacture according to claim 5, wherein the at least one type of monomer includes styrene.

7. The method of manufacture according to claim 5, wherein the at least one type of monomer includes at least one of acrylic acid ester and methacrylic acid ester.

8. The method of manufacture according to claim 5, wherein the at least one type of monomer contains from 1 to 5 wt % of the organosilane compound.

9. The method of manufacture according to claim 5, wherein said organosilane compound is a monoethylenically unsaturated organosilane compound.

10. The method of manufacture according to claim 5, wherein said solvent is an organic solvent.

11. The method of manufacture according to claim 1, wherein said organosilane compound is a monoethylenically unsaturated organosilane compound.

12. The method of manufacture according to claim 1, wherein said solvent is an organic solvent.

* * * * *